UNITED STATES PATENT OFFICE.

ERNEST SOLVAY, OF BRUSSELS, BELGIUM.

MANUFACTURE OF SODA.

SPECIFICATION forming part of Letters Patent No. 243,991, dated July 5, 1881.

Application filed May 11, 1881. (No specimens.)

*To all whom it may concern:*

Be it known that I, ERNEST SOLVAY, of Brussels, in the Kingdom of Belgium, manufacturer, have invented a new and useful Improvement in the Manufacture of Soda, of which the following is a specification.

My invention relates to the manufacture of soda by the process generally known as the "ammonia process," for which Letters Patent were granted to me in the United States, dated the 4th of March, 1873, and which process, as further improved by me, is described in the specification of Letters Patent granted to me bearing date the 16th of October, 1877, and the 25th of December, 1877; and this invention relates to the calcination of the bicarbonate of soda obtained in the manufacture of soda by the said ammonia process, whether ordinary ammonia or compound ammonia be used in the said process. The bicarbonate of soda, after it has been separated from the mother-liquor, and after its lixiviation, still contains a certain quantity of water, by which it is predisposed to become pasty when it is introduced into the apparatus known as the "decomposing or calcining apparatus," and this paste produces a crust or incrustation, which adheres to the said apparatus, and is very injurious thereto.

My invention consists in mixing with the bicarbonate of soda, previously to its introduction into the decomposing apparatus, a certain quantity of soda—that is to say, bicarbonate of soda already decomposed or calcined. By this addition of soda to the bicarbonate of soda the subsequent formation of paste, and the crusting or incrustation consequent thereon, are prevented. The proportion of soda to be added and mixed with the bicarbonate of soda will depend upon the quantity of moisture in the said bicarbonate; but the proportion will always be about fifty per centum, more or less, of the whole mixture—that is to say, the mixture will contain about equal quantities, by weight, of soda and of bicarbonate of soda.

As by the formation of the said mixture ammonia is caused to evolve, especially if hot soda from the decomposing apparatus be used, I prefer to effect the mixture in a closed vessel or apparatus disposed close to the entrance of the decomposing apparatus.

Having fully described my invention, what I desire to claim and secure by Letters Patent is—

The process of mixing soda with the bicarbonate of soda previously to the introduction of the said bicarbonate of soda into the decomposing apparatus, substantially as and for the purpose described.

ERNEST SOLVAY.

Witnesses:
G. PRÉTER,
ALFRED SOLVAY.